United States Patent [19]

Whisenhunt

[11] Patent Number: 5,752,461

[45] Date of Patent: May 19, 1998

[54] TEASER LINE PULLER

[76] Inventor: Kelsie C. Whisenhunt, 3311 51st Ave. Ter. West, Bradenton, Fla. 34207

[21] Appl. No.: 677,224

[22] Filed: Jul. 9, 1996

[51] Int. Cl.[6] ................................................. B63B 21/04
[52] U.S. Cl. ................................................. 114/253; 43/27.4
[58] Field of Search ................................ 114/255, 253; 43/26.1, 27.4

[56] References Cited

U.S. PATENT DOCUMENTS

| | | |
|---|---|---|
| 2,621,870 | 12/1952 | Barton . |
| 3,355,835 | 12/1967 | Lyons ................................. 43/27.4 |
| 4,283,025 | 8/1981 | Whisenhunt . |
| 4,875,428 | 10/1989 | Sclesch et al. ........................ 43/26.1 |

*Primary Examiner*—Jesus D. Sotelo
*Attorney, Agent, or Firm*—Bacon & Thomas

[57] ABSTRACT

A teaser line puller arrangement includes a support housing having a watertight chamber for containing electrical connections between a source of electrical energy and electric motors associated with electric motor driven teaser line reels that are attached to the support housing. An electric switch arrangement accessible from the exterior of the housing is used to control operation of the motor drives for the reels. Teaser lines can be reeled in rapidly simply by tripping the motor control switches. The chamber in the support housing is maintained in watertight condition by the use of appropriate sealing devices and the housing is attachable to sport fishing boat superstructure.

11 Claims, 2 Drawing Sheets

TEASER LINE PULLER

BACKGROUND OF THE INVENTION

1. Field of Invention

This invention is a teaser line puller system for setting and reeling sport or game teaser lines used with fishing boats.

2. Discussion of Related Art

Sport or game fishing boats routinely deploy teaser lures on teaser lines ahead of fishing lures used by sport fishermen to attract game fish while trolling. When a game fish strikes a fish lure, it is necessary to rapidly reel in or "pull" the teaser line to avoid entanglement with the fishing line or lines which are now moving in various directions due to the game fish hooked on the fishing lure.

The teasing lines typically are deployed from side booms extending from either side of the boat to keep the teaser lines away from the fishing lines that are deployed from the rear or aft end of the boat during trolling. Reeling in the teaser lines rapidly requires dexterity and coordination, particularly if two teaser lines must be pulled in at once. Manual reeling is inherently slow and tiring due to the physical work involved.

One prior art teaser line puller is comprised of a mounting bracket that is attachable to a boat superstructure near the rear of a boat and that carries a pair of manually operable teaser line reels arranged to deploy teaser lines towards the teaser line booms on either side of the boat. This places the reels in a good accessible position for reeling in the teaser lines but the manually operated reels can only be wound as fast as an operator can physically wind them.

Electrical motor powered deep sea or sport fishing reels are also known in the prior art, such as, for example, described in U.S. Pat. No. 4,283,025 to Whisenhunt.

BRIEF DESCRIPTION OF THE INVENTION

This invention is a teaser line puller or reel system that includes a housing structure that defines a watertight chamber and on which one or two electrical motor actuated reels can be supported for deploying and pulling teaser lines and which provide protection for electrical connectors and switch terminals that connect an electrical supply available on the boat to the reel motors. The housing also supports a suitable electrical switch or switches for controlling operation of the reels. The housing itself is mountable to a boat superstructure by suitable brackets or clamps associated with the housing. The housing also includes suitable ports or apertures for receiving electrical leads extending from an external power supply to a switch and from the switch to the reel motor or motors. Suitable sealing devices are usable with the ports to maintain the watertight state of the housing chamber.

BRIEF DESCRIPTION OF THE DRAWINGS

With reference to the appended drawings.

DETAILED DESCRIPTION OF PREFERRED EMBODIMENT OF THE INVENTION

Figure 1:
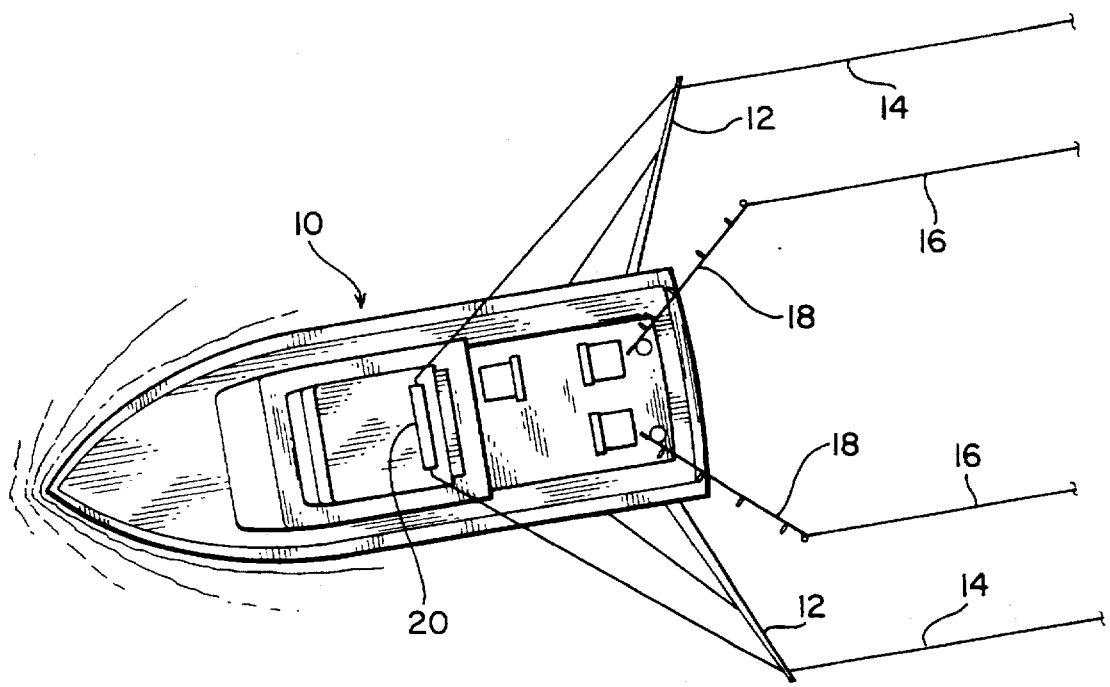
FIG. 1 is a schematic illustration of a fishing boat rigged with teaser line booms and a teaser line puller system incorporating this invention.

With reference to the appended drawings, FIG. 1 illustrates a marine vessel such as a sport fishing boat 10 rigged with a pair of teaser line side booms 12 that support a pair of teaser lines 14 connected to teaser lures (not illustrated) that trail the boat in advance of fishing lines 16 that have been deployed from fishing rods 18.

The teaser lines 14 extend forward to teaser line reels (not illustrated) supported by a teaser line holder 20 mounted on a superstructure of the boat 10, for example the aft canopy support of a flying or upper bridge of the boat.

In accordance with known procedures, teaser lines are set ahead of the fishing lures carried by fishing lines 16 to attract game fish to the fishing area. However, upon the occurrence of a strike on a fishing line 16, the teaser lines 14 must be immediately pulled into the boat and away from the fishing lines 16 to prevent entanglements resulting from movements of the game fish.

Figure 2:
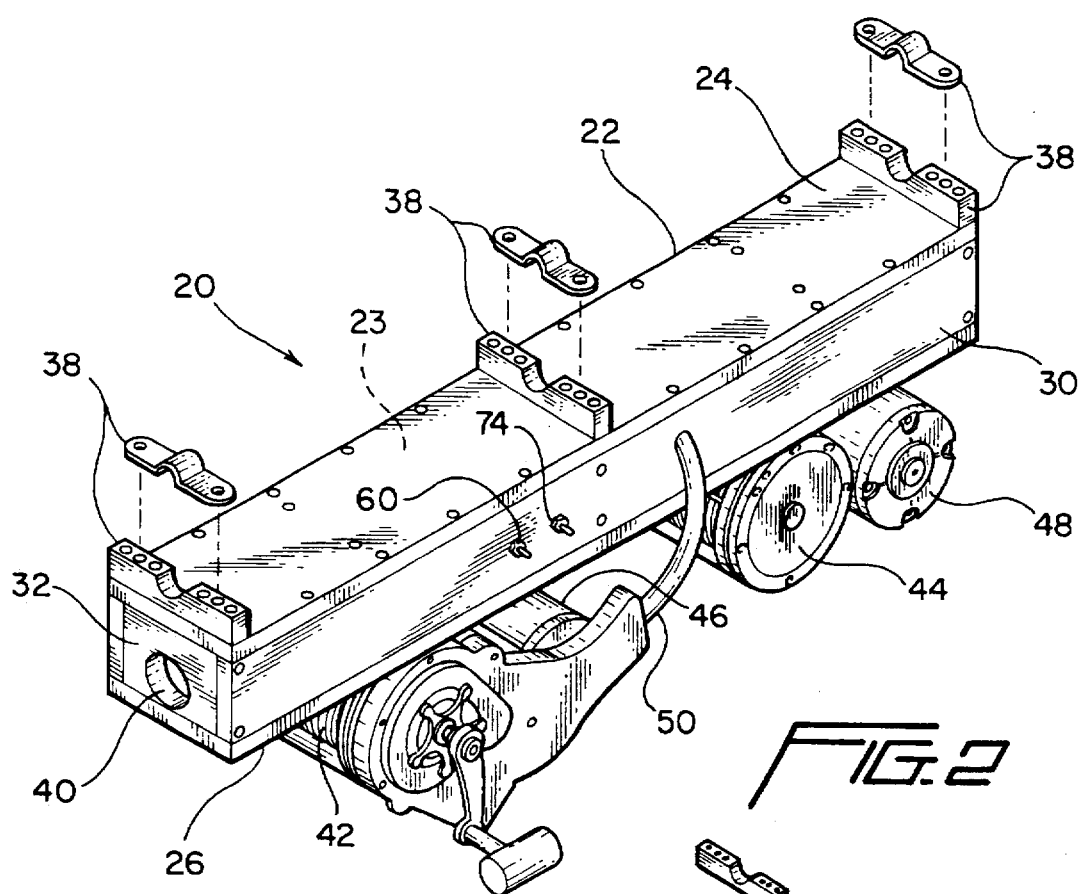
FIG. 2 illustrates the teaser line puller in accordance with this invention.
Figure 3:
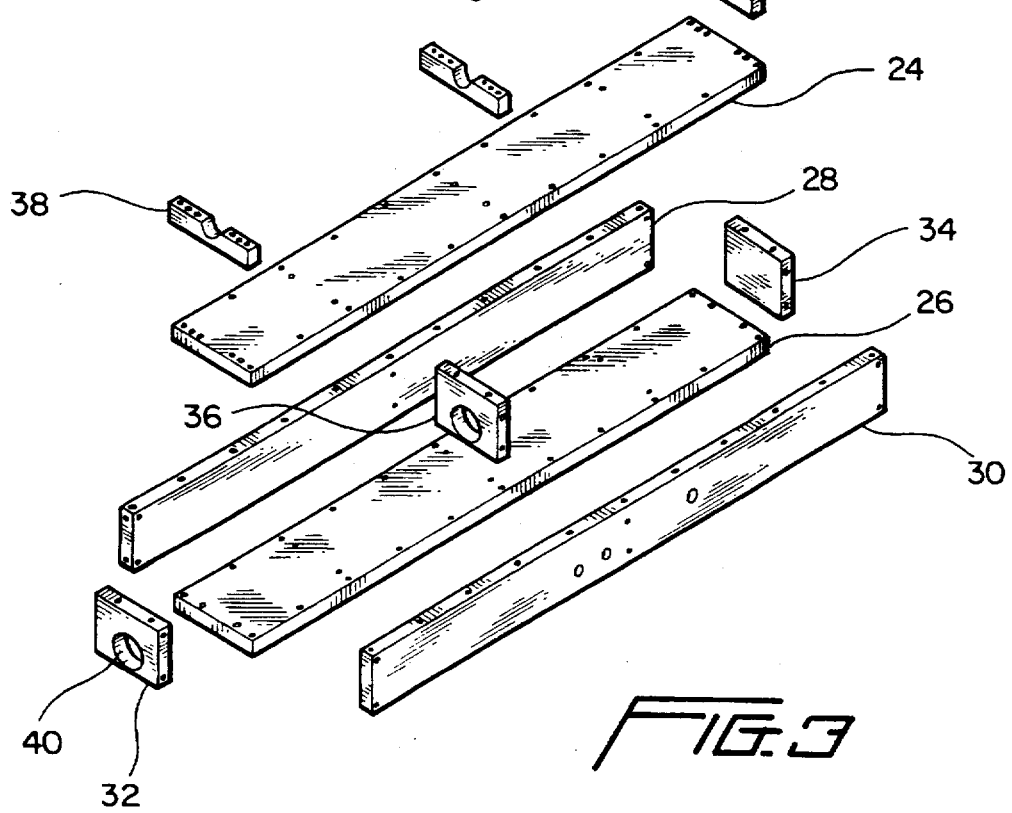
FIG. 3 is an exploded view of the support housing of the teaser line puller according to the present invention.

In accordance with the present invention, as seen in FIGS. 2 and 3, a teaser line puller support 20 comprises a support housing 22 preferably formed of synthetic resin sheet stock assembled with watertight sealant at the joint areas between the components of the housing so as to define a watertight chamber 23 interiorly of the housing 22.

The housing is formed of top and bottom panels 24,26 assembled to side panels 28,30 and end panels 32,34 using suitable fasteners and sealant in the joint areas between the panels. A central reinforcing panel 36 may be mounted generally centrally within the housing to provide a stiffening effect for the housing between the end plates 32,34.

An attaching structure for mounting the housing 22 to a marine vessel superstructure comprises pipe clamps 38 which readily enable the housing 22 to be clamped to a tubular portion of a boat superstructure, for example a canopy support for the flying bridge of a sport fishing boat. Other suitable clamping arrangements can be utilized for enabling the housing 22 to be mounted onto a boat structure at an appropriate location to enable threading of teaser lines from reels carried by the housing to the side booms of the fishing boat.

The housing 22 furthermore includes an access opening or port 40 that provides communication between the interior of the watertight chamber 23 in the housing 22 and the exterior of the housing. The port 40 is adapted to receive an electrical wire or lead connected or connectable to a source of electrical energy in a manner to be described below.

A pair of electric motor-driven fishing line reels 42,44 are mounted to the bottom panel 26 of housing 22 by means of appropriate fasteners. The electric motor-driven reels 42,44 may be of the type described in U.S. Pat. No. 4,283,025 issued to the inventor named herein and which is incorporated herein by reference for its description of the details of the electric motor-driven reels.

The motors 46,48 drivingly connected to reels 42,44 respectively, are connected to electric leads to a source of electrical energy under the control of a switch device that will be described below.

Figure 4:
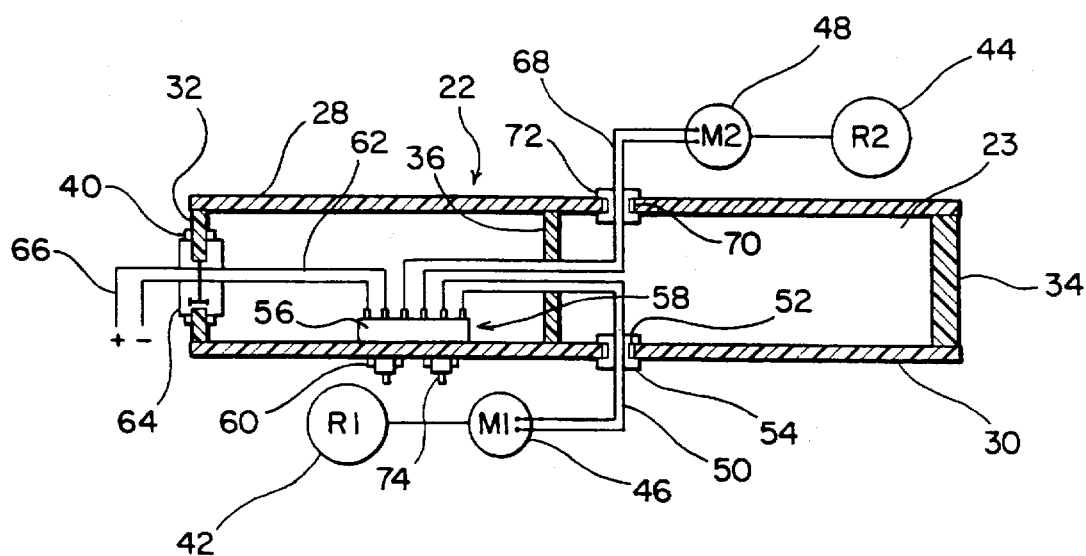
FIG. 4 is a section plan view schematically illustrating the electrical wiring and control switch arrangement of the teaser line puller.

As illustrated in FIG. 4, motor 46 associated with reel 42 is connected to motor electrical lead 50 extending through motor lead port 52 in side panel 30. A sealing device 54 is provided to maintain the chamber within housing 22 in watertight condition. While a separate sealing device 54 is illustrated in FIG. 4, it will be understood that, under appropriate conditions, the exterior insulation of the motor lead 50 may itself provide sufficient sealing capacity to eliminate the need for a separate seal to be assembled within port 52.

The motor lead 50 is connected to the terminal block or connector portion 56 of a switch assembly 58 in chamber 23 that includes in this embodiment an externally accessible switch actuator 60 for operating the switch to control motor 46. The switch 58 is also connected at its terminal block 56 to power supply lead 62 that is received through port 40 of end panel 32 of housing 22. A suitable seal 64 is provided in port 40 to maintain the watertight characteristic of the chamber 23. The seal 64, of course, could comprise an appropriate quick release electrical plug for connecting the power supply lead 62 with an external power supply lead 66 or, in the alternative, leads 62 and 66 may be a continuous electric lead with a suitable seal device 64 provided at the port 40 for preventing ingress of water into the chamber 23 in housing.

The second motor 48 connected to the second reel 44 is also connected to motor lead 68 which extends through motor lead port 70 in panel 28 having a watertight seal 72 therein. The motor lead 68 extends to the terminal or connector portion 56 of switch 58 as schematically illustrated in FIG. 4. External switch actuator 74 accessible from the exterior of the housing 22 controls operation of motor 48 in the same manner that switch actuator 60 controls operation of motor 46 by connecting the motor to a source of electric energy provided via lines 62,66 when the switch 74 is actuated to the "on" position.

It will thus be seen that the terminal or connector portion 56 of the switch 58 is maintained isolated from any water that may be present about the housing 22 to thereby maintain the terminal portion 56 of switch 58 isolated from the effects of water contamination which, in the case of sea water, would cause corrosion and short-circuiting of the electrical components. The switch actuators 60,74 are also suitable sealed against any ingress of water into the chamber within housing 22.

The invention thus provides a suitable support for electrically operated teaser line puller reels while maintaining critical electrical connections isolated from water.

While a pair of switch actuators 60,74 is illustrated, both reel motors could be actuated simultaneously by a single switch device if desired. Also, although manually actuated switch elements 60,74 are illustrated, a suitable remote switch actuator could be utilized, for example, using infrared or acoustic energy, in which case a suitable mounting arrangement would be provided on the housing 22 for receiving a switch signal transmitted from a remote switch transmitter of the type known in the art, for example, transmitters used with automatic garage door openers.

While the support housing 22 is illustrated as having a substantially square cross-section, any suitable cross-section could be utilized provided that the support housing includes a watertight chamber associated with the housing, preferably internally of the housing. The watertight chamber 23, of course, also provides a chamber for housing other electrical or electronic components that need to be shielded from moisture, for example, electronic components that would automatically actuate the reels 42,44 in the event of a strike on a fishing line.

While the support housing 22 is shown formed of synthetic resin sheet stock, any suitable material could be utilized so long as a watertight chamber is provided in the housing or is otherwise associated with the housing. A non-conductive plastic material, however, avoids problems arising due to corrosion and electrical leakage and short-circuiting due to conductor insulation failure.

While a simplified electrical terminal block 56 is illustrated, it is to be understood that this is a schematic representation only and the switch 58 may have internally connected terminals mounted in a resin material with short lead lines connected by connectors to the power supply lines 62,66 or the motor leads 50,68.

Motor leads 50,68 could be threaded through a single port in a panel of the support housing 22 if desired to simplify sealing of the chamber 23 or they could be threaded back through the single port 40 with the same objective to the extent that such a wiring arrangement is practical and desired.

While switch 58 is shown as a single switch assembly, multiple switches could be utilized for controlling the reel motors without departing from the invention.

Various substitutions and modifications of the preferred embodiment illustrated in the drawings and described herein can be made without departing from the invention as defined the claims. It is to be understood that persons skilled in the art may envision various substitutions of functionally equivalent structure for the structural elements described without departing from the scope of the invention described and claimed herein.

What is claimed is:

1. A teaser line puller comprising a teaser line reel support housing having a watertight chamber associated therewith;

attaching structure associated with the support housing for enabling the housing to be secured to a marine vessel superstructure;

at least one teaser line reel mounted on the exterior of the support housing;

an electric motor drivingly connected to the teaser line reel and located outside the support housing for actuating the reel upon energization;

a control switch mounted on the housing for controlling energization of the electric motor, said switch including an electrical connector or connectors in said chamber and a switch actuating feature accessible from outside the chamber;

said chamber including an access port adapted to receive an electrical supply lead connectable to an electrical power source outside the chamber and an electric motor lead port adapted to receive an electric lead extending from the switch terminal block to the electric motor;

an electric motor lead connected to the switch and extending through the motor lead port and to the electric motor for transmitting energizing electrical input to the motor from the switch when the switch is actuated to the "on" position;

an electrical supply lead extending through said access port and connected to the switch for supplying electrical input energy to the switch from an electricity source outside the chamber;

said access and motor lead ports being sealed against water entry into the chamber.

2. A teaser line puller as claimed in claim 1, wherein said housing includes upper and lower sides, said attaching structure being located on the housing upper side and said teaser line reel and said motor being mounted on the housing exterior lower side.

3. A teaser line puller as claimed in claim 1, wherein said chamber is defined by side walls that also define the housing.

4. A teaser line puller as claimed in claim 1, including a pair of teaser line reels and associated electric drive motors and switch controllers mounted on the support housing; said control switches being adapted to control energization of both reel motors; and an electric motor lead for each motor connected to the switch and extending from the switch to the respective motors.

5. A teaser line puller as claimed in claim 1, wherein said attaching structure comprises pipe clamps for engaging tubular or rod-like superstructure.

6. A teaser line reel support comprising a support housing defining a watertight interior chamber;

attaching structure associated with the support housing for enabling the housing to be secured to a marine vessel superstructure;

means for mounting at least one electric motor driven teaser line reel to the exterior of the housing;

means for mounting an electrical control switch on the housing such that a terminal connector of the switch is locatable internally of the chamber while a switch actuating feature is accessible from outside the chamber;

at least one port in the housing for receiving at least one electrical lead extending between the interior and exterior of the chamber.

7. A teaser line reel support as claimed in claim 6, including means for mounting two electric motor driven teaser line reels on the exterior of the housing.

8. A teaser line reel support as claimed in claim 6, said housing being formed of non-conductive synthetic resin material.

9. A teaser line reel support as claimed in claim 6, including a watertight seal associated with said at least one port.

10. A teaser line reel support as claimed in claim 9, including an additional port in the housing for receiving an electrical lead extending between the interior and exterior of the chamber, and further including a watertight seal for said additional port.

11. A teaser line reel support as claimed in claim 6, including means for mounting an electrical switch in said chamber, and means on the housing for enabling access to the switch from outside the chamber for actuation of the switch.

* * * * *